United States Patent [19]
Jensen et al.

[11] Patent Number: 5,991,309
[45] Date of Patent: Nov. 23, 1999

[54] BANDWIDTH MANAGEMENT SYSTEM FOR A REMOTE REPEATER NETWORK

[75] Inventors: Dana J. Jensen, Lynchburg, Va.; Steven J. Pfiefer, Owatonna, Minn.; James K. Lyon, Waseca, Minn.; Mark D. Dvorak, Waseca, Minn.

[73] Assignee: E.F. Johnson Company, Burnsville, Minn.

[21] Appl. No.: 08/628,981

[22] Filed: Apr. 12, 1996

[51] Int. Cl.$^6$ .............................. H04J 1/10; H04J 1/02; H04B 7/14; H04B 7/15

[52] U.S. Cl. .................... 370/492; 370/494; 370/495; 455/20; 455/11.1; 455/118

[58] Field of Search .............................. 455/17, 20–21, 455/22, 45–48, 104, 109, 93, 103, 118, 114, 11.1, 16, 202–203, 313, 314; 370/492, 493, 494, 495, 319, 344

[56] References Cited

U.S. PATENT DOCUMENTS

| | | | |
|---|---|---|---|
| Re. 34,036 | 8/1992 | McGeehan et al. | 455/71 |
| 3,867,700 | 2/1975 | Wycoff | 325/50 |
| 4,085,368 | 4/1978 | Yeh | 325/304 |
| 4,125,744 | 11/1978 | Goodall | 179/1.5 R |

(List continued on next page.)

FOREIGN PATENT DOCUMENTS

| | | |
|---|---|---|
| 0004702 | 10/1979 | European Pat. Off. . |
| 0020893 | 1/1981 | European Pat. Off. . |
| 0515214 | 11/1992 | European Pat. Off. . |
| 0551126 | 7/1993 | European Pat. Off. . |
| 3203678 | 8/1983 | Germany . |
| 6508593 | 1/1967 | Netherlands . |
| 1574599 | 4/1977 | United Kingdom . |
| WO93/07681 | 4/1993 | WIPO . |
| WO93/11614 | 6/1993 | WIPO . |

OTHER PUBLICATIONS

Alisouskas, Digital and Data Communications, pp: 88–89, and 119–126, 1985.

Hattori, T., et al., "Theoretical Studies of a Simulcast Digital Radio Paging System Using a Carrier Frequency Offset Strategy", *IEEE Transactions on Vehicular Technology*, vol. VT–29, No. 1, pp. 87–95, (Feb. 1980).

"Digital Signal Processing Applications Using the ADSP–2100 Family", *vol. 1 Prentice Hall, Inc., edited by Amy Mar,* 457–465, (1992).

Doug Hall, "DSPs ease task of detecting tones", *Personal Engineering,* 69–72, (Jan. 1996).

Antoniou, Andreas, "Digital Filters: Analysis and Design," McGraw–Hill Book Company, edited by Frank J. Cerra, pp. 214–215 (1979).

Haykin, Simon, "Communications Systems," 2nd Edition, John Wiley & Sons, Inc., pp. 141–146 and 171–172 (1983).

Shanmugam, K. Sam, "Digital and Analog Communications Systems," John Wiley & Sons, Inc., pp. 268–272 and 321–322 (1979).

Weaver, Jr.,Donald K., "A Third Method of Generation and Detection of Single–Sideband Signals," *Proceedings of the IRE,* pp. 1703–1705 (Dec. 1956).

*Primary Examiner*—Douglas W. Olms
*Assistant Examiner*—David R Vincent
*Attorney, Agent, or Firm*—Schwegman, Lundberg, Woessner & Kluth, P.A.

[57] ABSTRACT

A bandwidth management system for a remote repeater network for modifying a first signal to create a second signal within the bandwidth of a communications link, transferring the second signal across the communications link, and reconstructing the first signal at the remote end of the communications link. The bandwidth management system featuring several mixing modes for performing the signal conversion and reconstruction. The system offering a calibration feature to correct for phase distortions introduced in reconstruction of the original signal. The calibration feature incorporating signals from a global positioning satellite system for reconstruction.

12 Claims, 14 Drawing Sheets

U.S. PATENT DOCUMENTS

| | | | |
|---|---|---|---|
| 4,131,849 | 12/1978 | Freeburg et al. | 325/54 |
| 4,131,850 | 12/1978 | Wilcox | 325/137 |
| 4,255,620 | 3/1981 | Harris et al. | 179/15.55 |
| 4,281,413 | 7/1981 | Forrest | 455/34 |
| 4,325,057 | 4/1982 | Bishop | 340/539 |
| 4,406,016 | 9/1983 | Abrams et al. | 455/19 |
| 4,490,830 | 12/1984 | Kai et al. | 375/40 |
| 4,516,269 | 5/1985 | Krinock | 455/51 |
| 4,608,686 | 8/1986 | Barsellotti | 370/69.1 |
| 4,679,243 | 7/1987 | McGeehan et al. | 455/47 |
| 4,696,051 | 9/1987 | Breeden | 455/33 |
| 4,696,052 | 9/1987 | Breeden | 455/51 |
| 4,726,069 | 2/1988 | Stevenson | 455/46 |
| 4,802,191 | 1/1989 | McGeehan et al. | 375/43 |
| 4,803,739 | 2/1989 | Kaikoku et al. | 455/47 |
| 4,852,090 | 7/1989 | Borth | 370/104 |
| 4,862,098 | 8/1989 | Yassa et al. | 329/50 |
| 4,903,292 | 2/1990 | Dillon | 379/93 |
| 4,972,410 | 11/1990 | Cohen et al. | 370/100.1 |
| 4,994,804 | 2/1991 | Sakaguchi | 341/143 |
| 5,003,617 | 3/1991 | Epsom et al. | 455/51 |
| 5,038,403 | 8/1991 | Leitch | 455/51 |
| 5,060,240 | 10/1991 | Erickson et al. | 375/38 |
| 5,061,934 | 10/1991 | Brown et al. | 342/162 |
| 5,077,759 | 12/1991 | Nakahara | 375/107 |
| 5,105,439 | 4/1992 | Bennett et al. | 375/10 |
| 5,113,413 | 5/1992 | Brown et al. | 375/40 |
| 5,117,424 | 5/1992 | Cohen et al. | 370/105.5 |
| 5,117,503 | 5/1992 | Olson | 455/51.1 |
| 5,127,101 | 6/1992 | Rose, Jr. et al. | 455/51.1 |
| 5,128,934 | 7/1992 | Jasinski | 370/84 |
| 5,131,007 | 7/1992 | Brown et al. | 375/40 |
| 5,131,010 | 7/1992 | Derrenge et al. | 375/100 |
| 5,134,630 | 7/1992 | Bateman | 375/1 |
| 5,142,692 | 8/1992 | Owen | 455/48 |
| 5,155,859 | 10/1992 | Harris et al. | 455/51.2 |
| 5,172,396 | 12/1992 | Rose, Jr. et al. | 375/107 |
| 5,184,242 | 2/1993 | Yamashita | 359/177 |
| 5,194,871 | 3/1993 | Counselman, III | 342/357 |
| 5,201,061 | 4/1993 | Goldberg et al. | 455/51.2 |
| 5,212,807 | 5/1993 | Chan | 455/33.4 |
| 5,218,621 | 6/1993 | Cudak et al. | 375/11 |
| 5,218,717 | 6/1993 | Reitberger | 455/51.2 |
| 5,227,741 | 7/1993 | Marchetto et al. | 332/100 |
| 5,239,672 | 8/1993 | Kurby et al. | 455/16 |
| 5,243,299 | 9/1993 | Marchetto et al. | 329/300 |
| 5,257,404 | 10/1993 | Goreham et al. | 455/51.2 |
| 5,261,118 | 11/1993 | Vanderspool, II | 455/51.2 |
| 5,280,629 | 1/1994 | Lo Galbo et al. | 455/51.2 |
| 5,287,550 | 2/1994 | Fennell et al. | 455/51.2 |
| 5,295,178 | 3/1994 | Nickel et al. | 379/58 |
| 5,319,374 | 6/1994 | Desai et al. | 342/387 |
| 5,327,581 | 7/1994 | Goldberg | 455/51.2 |
| 5,353,307 | 10/1994 | Lester et al. | 375/14 |
| 5,353,342 | 10/1994 | Pietrowicz | 379/257 |
| 5,361,398 | 11/1994 | Christian et al. | 455/51.2 |
| 5,365,569 | 11/1994 | Witsaman et al. | 379/57 |
| 5,369,682 | 11/1994 | Witsaman et al. | 379/57 |
| 5,384,574 | 1/1995 | Counselman, III | 342/357 |
| 5,392,278 | 2/1995 | Teel et al. | 370/58.3 |
| 5,398,263 | 3/1995 | Vanderspool. II | 375/376 |
| 5,408,681 | 4/1995 | Ressler et al. | 455/17 |
| 5,414,734 | 5/1995 | Marchetto et al. | 375/267 |
| 5,416,808 | 5/1995 | Witsaman et al. | 375/350 |
| 5,423,056 | 6/1995 | Linquist et al. | 455/33.1 |
| 5,423,058 | 6/1995 | Cudak et al. | 455/51.2 |
| 5,423,059 | 6/1995 | Lo Galbo et al. | 455/51.2 |
| 5,440,313 | 8/1995 | Osterdock et al. | 342/352 |
| 5,448,570 | 9/1995 | Toda et al. | 370/95.3 |
| 5,448,758 | 9/1995 | Grube et al. | 455/51.2 |
| 5,465,405 | 11/1995 | Baseghi et al. | 455/226.4 |
| 5,473,638 | 12/1995 | Marchetto et al. | 375/356 |
| 5,477,539 | 12/1995 | Brown | 370/84 |
| 5,481,258 | 1/1996 | Fawcett et al. | 340/825.47 |
| 5,483,575 | 1/1996 | Zandowski et al. | 379/58 |
| 5,483,670 | 1/1996 | Childress et al. | 455/34.1 |
| 5,490,172 | 2/1996 | Komara | 375/296 |
| 5,513,215 | 4/1996 | Marchetto et al. | 375/233 |
| 5,555,546 | 9/1996 | Matsumoto | 315/244 |
| 5,590,403 | 12/1996 | Cameron et al. | 455/51.2 |
| 5,619,564 | 4/1997 | Canniff et al. | 379/386 |
| 5,668,836 | 9/1997 | Smith et al. | 375/316 |

BANDWIDTH MANAGEMENT SYSTEM FOR A REMOTE REPEATER NETWORK

FIELD OF THE INVENTION

The present invention relates generally to a bandwidth management system, and more particularly, to a system for managing signals transceived between repeaters and their respective mobile units so that the signals may be communicated between remote repeaters to enhance the coverage area of a repeater network.

BACKGROUND OF THE INVENTION

Remote repeater networks are used in a variety of applications, including police, fire, and emergency mobile radio communications environments. In one example, a number of mobile transceivers are in communication with a repeater which is in proximity to the mobiles. The area of coverage of the repeater system is increased by linking the repeaters. One way to link the repeaters uses a microwave link.

Difficulties arise when the bandwidth of the information communicated between the mobiles and their respective repeaters includes bandwidths not supported by inter-repeater links. In one example, subaudible signalling is employed in mobile trunked radio communication systems. The subaudible signalling increases the audio bandwidth of the signals which must be communicated between the mobile transceivers and their respective repeaters. Furthermore, the subaudible signalling increases the audio bandwidth of the signals transmitted between repeaters. In the example where a microwave link is used to interconnect repeaters, the bandwidth of each microwave multiplexed channel must be increased to handle the subaudible signalling. Existing microwave multiplexing systems are not adapted to transceive subaudible signals.

Therefore, there is a need in the art for a system for bandwidth management. The bandwidth management system should introduce little distortion while performing frequency translations. Furthermore, the bandwidth management system should function with existing multiplexer systems to eliminate the need to modify or replace inter-repeater links.

SUMMARY OF THE INVENTION

The present system provides a bandwidth management system capable of performing frequency translations on signals of a first spectral content to convert them to signals of a second spectral content, transfer the converted signals, and then deconvert the signals to their original spectral content.

In this specification, the bandwidth management system will be described using an example of a repeater-based system having subaudible signalling which is not within the passband of a microwave multiplexer. Therefore, the embodiments herein describe a system for positioning the subaudible signalling within the passband of the microwave multiplexer. However, these examples are for purposes of demonstrating the present bandwidth management system, and are not intended in a limiting or exclusive sense. The present bandwidth management system is also applicable for any signal bandwidth management application, and the use of the present system in a repeater network is intended to demonstrate the present system and is not intended in a limiting or exclusive sense. The present bandwidth management system is also applicable for performing a variety of spectral translations using the methods and apparatus disclosed and the spectral translations demonstrated herein are not intended to be exclusive or limiting.

In one embodiment, the signal is divided into a low frequency component and a high frequency component. The high frequency component is not modified, however, the low frequency component is translated upband of the high frequency component to position it within the passband of the microwave multiplexer. The upband translation of the low frequency component produces an upper and lower sideband signal at the carrier frequency. In one embodiment, the lower sideband is removed with a low pass filter. In another embodiment, the lower sideband is removed with a bandpass filter.

In an alternate embodiment, a single sideband representation of the low frequency component is moved upband without using a low pass or bandpass filter.

In another embodiment, a single sideband generation method using Weaver's method is incorporated to generate a translated single sideband representation of the low frequency component which is upband of the high frequency component.

Deconversion of the translated signals may be performed by the inverse operation of any of the upconversion methods.

Also included is an embodiment whereby spectral distortions are reduced in the step of deconverting the spectral signals. In this embodiment, a signal from a common reference, such as a global positioning satellite, is incorporated in the deconversion step to prevent distortion to the deconverted signals.

BRIEF DESCRIPTION OF THE DRAWING

Referring now to the drawings in which like reference numbers represent corresponding parts throughout.

DETAILED DESCRIPTION

In the following detailed description, references made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized in that electrical, logical, and structural changes may be made without departing from the spirit and scope of the present invention. The following description is, therefore, not to be taken in a limiting sense and the scope of the present invention is defined by the appended claims and equivalents thereof.

In this specification, the bandwidth management system is described using an example of a repeater-based system having subaudible signalling which is not within the passband of a microwave multiplexer. Therefore, the embodiments herein describe a system for positioning the subaudible signalling within the passband of the microwave multiplexer. However, these examples are for purposes of demonstrating the present bandwidth management system, and are not intended in a limiting or exclusive sense. The present bandwidth management system is also applicable for any signal bandwidth management application, and the use of the present system in a repeater network is intended to demonstrate the present system and is not intended in a limiting or exclusive sense. The present bandwidth management system is also applicable for performing different spectral translations, such as multiband, low pass, and high pass signal translation.

Figure 1:
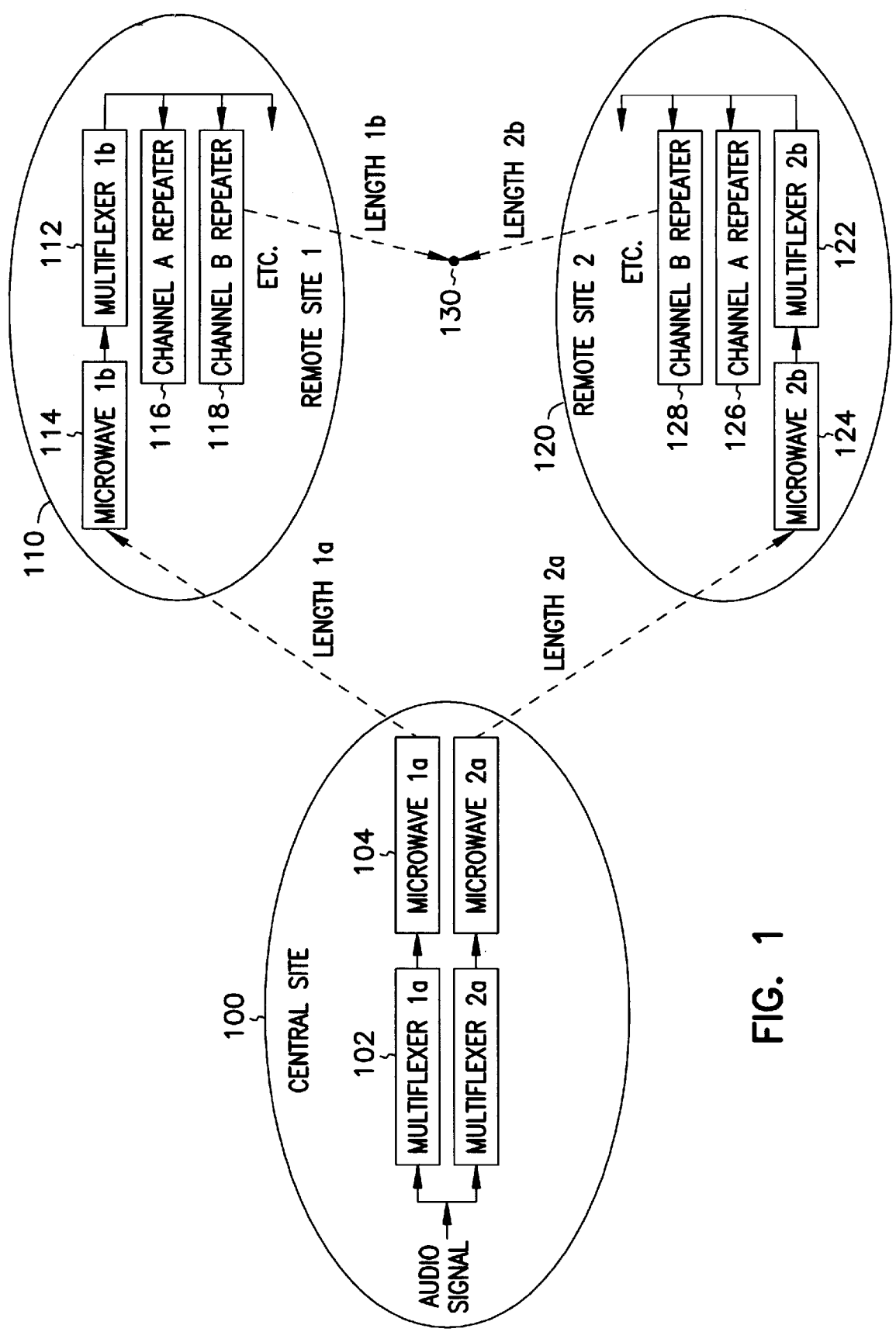
FIG. 1 is a block diagram of one environment in which the present bandwidth management system may be practiced.

FIG. 1 shows one environment in which the present invention may be practiced. In FIG. 1, two remote repeater sites 110 and 120 are in communication with central site 100 over the microwave equipment including transceivers 104, 114, and 124 and multiplexers 102, 112, and 122. Other links may be used without departing from the scope of the present invention. For example, instead of microwave links the system could employ optical fiber links. Furthermore, the system in FIG. 1 shows two channels, A and B, to demonstrate the present system. Other numbers of channels are possible without departing from the scope of the present invention.

Mobile transceivers (not shown in FIG. 1) communicate with the repeater site which provides the best signal. Intersite communications are possible using a system of subaudible signalling, such as the system described in U.S. Pat. No. 5,159,701, entitled "METHOD AND APPARATUS FOR A DISTRIBUTIVE WIDE AREA NETWORK FOR A LAND MOBILE TRANSMISSION TRUNKED COMMUNICATION SYSTEM", which is hereby incorporated by reference. In this system, subaudible tones are used to transmit control signals to facilitate inter-repeater communications.

In such a trunked radio system the spectral content of the control data typically extends from nearly DC to 300 Hz. The control data is transmitted with voice information, data information, or both. The control information transmitted by central site 100 provides commands and information to the radio units serviced by repeater sites 110 and 120.

In one scenario, control information having a bandwidth of approximately DC to 300 Hz is generated at central site 100 and must be communicated, along with a 300 Hz to 3000 Hz audio signal, to the repeater sites 110 and 120. Other spectral subdivisions may be managed by the present bandwidth management system without departing from the spirit and scope of the present invention, and the present system is not limited to the stated frequency subdivisions.

The present bandwidth management system allows the use of existing link equipment, whose passband extends from 300 Hz to 3400 Hz. The use of existing equipment allows flexibility in the design of systems since many companies can supply such equipment. Using existing, rather than specially designed, and therefore more costly, equipment also reduces overall system cost.

DATA MOVEMENT

In existing multiplexer equipment the passband extends from 300 Hz to 3400 Hz, however the information we wish to pass consists of a high frequency component which extends from 300 Hz to 3000 Hz, and a low frequency component which extends from nearly DC to approximately 300 Hz. For purposes of this example, the low frequency component is a data signal and the high frequency component is an audio signal. Several different systems for performing upband and downband frequency translation are described below. These systems are intended as examples to demonstrate the present bandwidth management system, and are not intended in an exclusive or limiting sense. Various combinations may be employed and variations may be introduced without departing from the scope and spirit of the present invention.

I. Signal Translation System

Figure 2A:
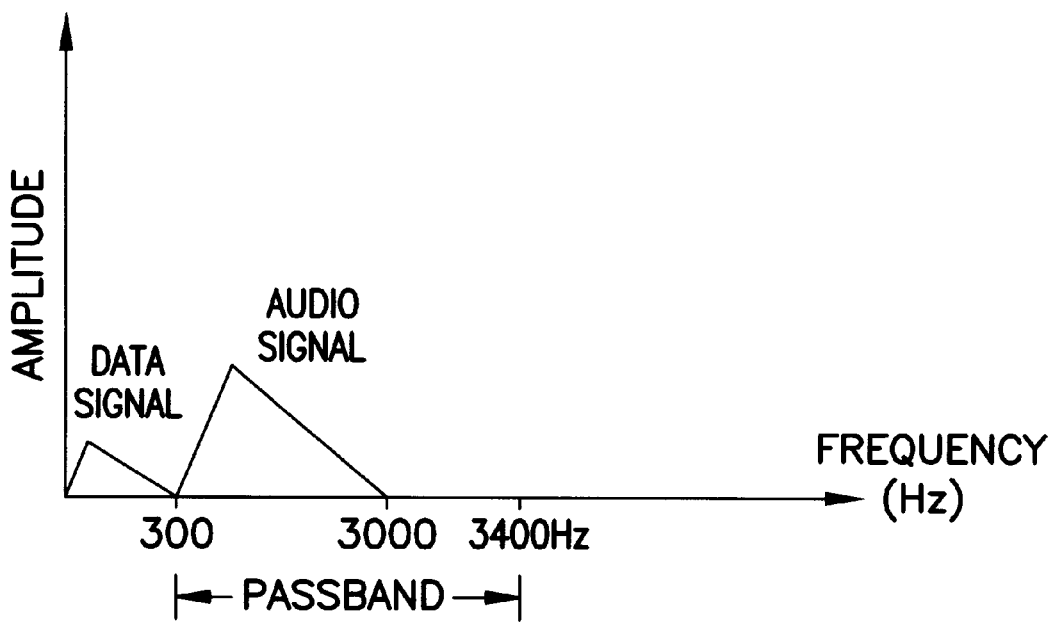
FIG. 2A shows a frequency spectrum of a first composite signal.

FIG. 2A shows the original composite signal and the passband of the existing multiplexing equipment. It is apparent that the data signal will not be passed by the existing multiplexing equipment. If the entire composite signal is shifted upband by 300 Hz, then the entire composite signal falls within the passband of the existing multiplexing equipment.

In one embodiment, the whole signal spectrum (composite signal) is translated upband by 300 Hz. In this case the data signal extends from 300 Hz to 600 Hz and the audio signal extends from 600 Hz to the top of the multiplexer passband. If the multiplexer passband is less than 3300 Hz, then the upper portion of the audio signal will be attenuated. This compromise may be acceptable for the benefit of transferring the data signal. Shifting the entire spectrum up by 300 Hz provides the same amount of isolation between the data and audio signals as exhibited by the composite signal.

Figure 2B:
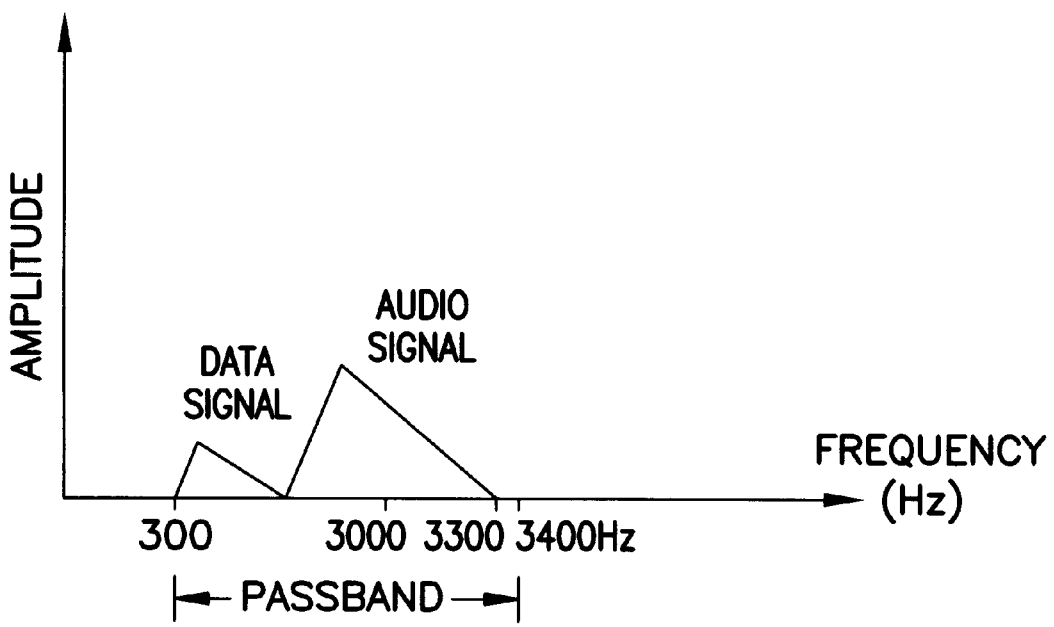
FIG. 2B shows a frequency spectrum of a translated version of the first composite signal in FIG. 2A.
Figure 3:
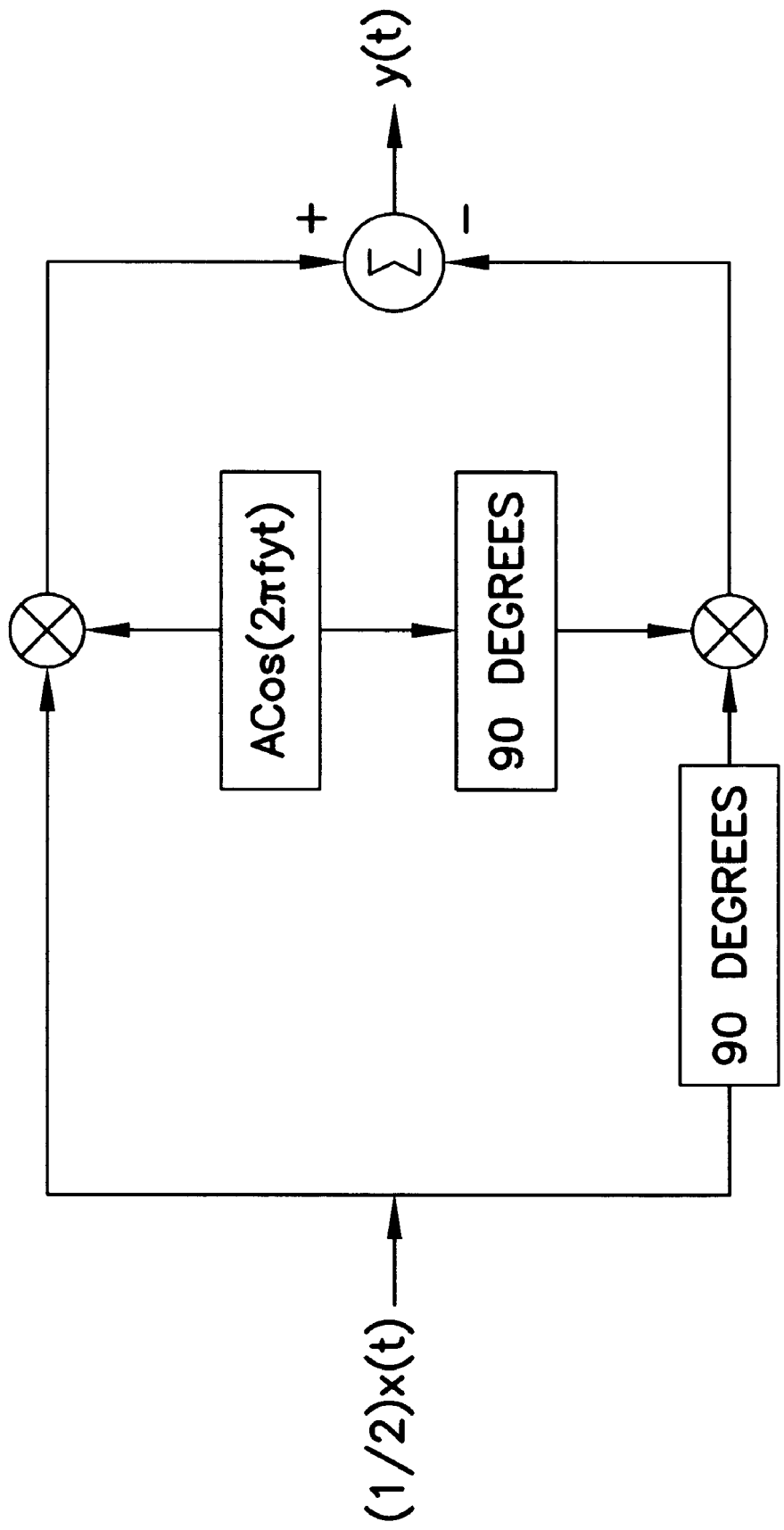
FIG. 3 is a block diagram of one embodiment of a frequency translation system.

One system for translating the composite signal in frequency is demonstrated by FIG. 3. In FIG. 3, fy is equal to the amount of frequency shift desired for the input signal x(t)/2. In the example of FIGS. 2A and 2B, fy is equal to a 300 Hz tone is used to translate the x(t)/2 input signal, which is the composite signal, upband by 300 Hz. Other tone frequencies may be used to translate the composite signal to different frequencies. Therefore, if the composite signal, shown in FIG. 2A, is the input signal, x(t)/2, then the output signal using a 300 Hz tone is shown in FIG. 2B.

Figure 4:
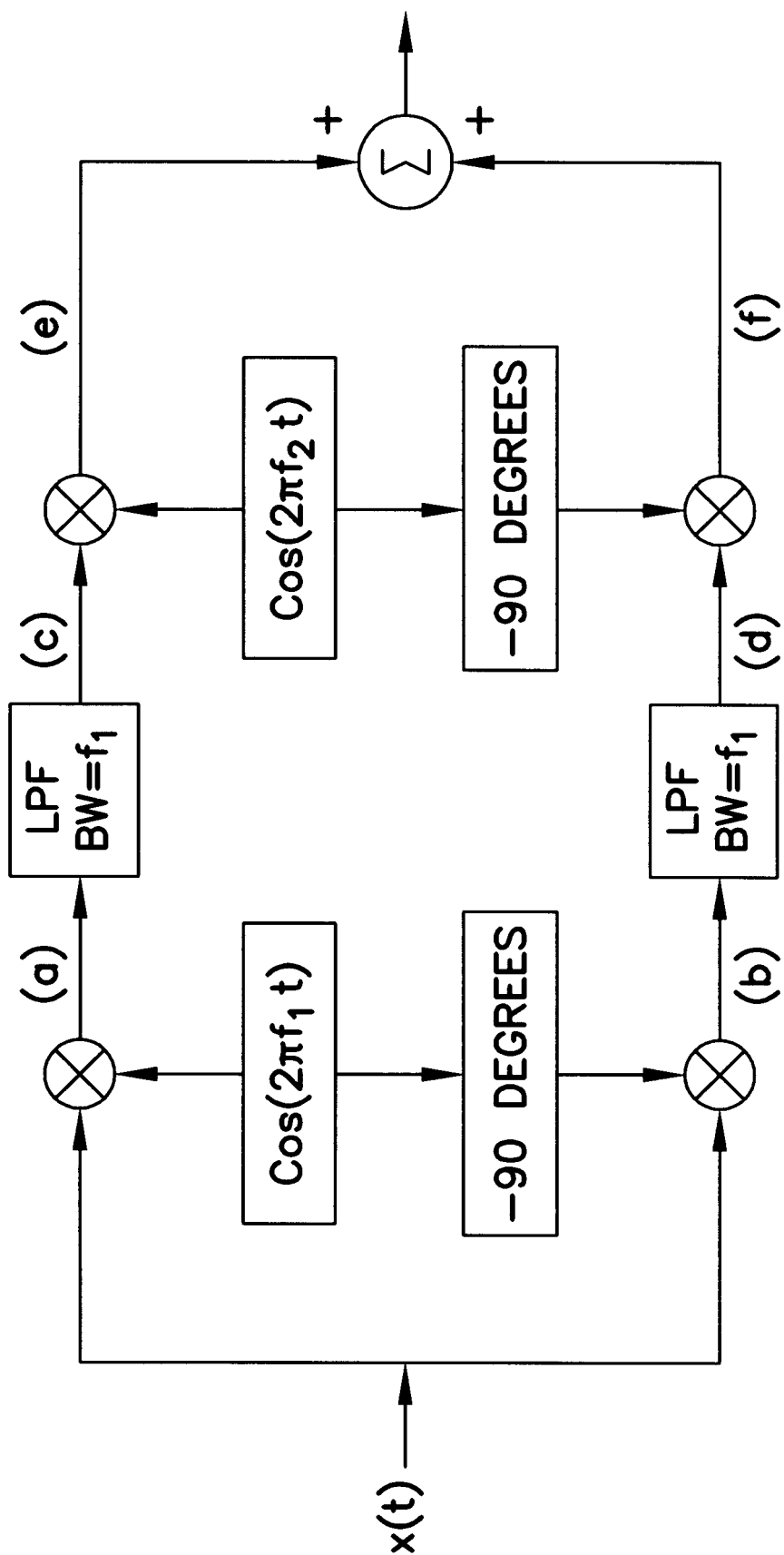
FIG. 4 is a block diagram of one embodiment of a frequency translation system.

Another system for translating the composite signal is demonstrated by FIG. 4, which uses Weaver's method to translate the composite signal in frequency. In FIG. 4 the x(t) signal is the composite signal. To perform the translation shown in FIGS. 2A and 2B the frequencies of f1 is set to 3000 Hz, f2 is 3300 Hz, so that f1-f2 is equal to the desired frequency shift. Furthermore, in this example the low pass filter bandwidth is equal to f1 (3000 Hz in this example). Other frequencies may be used as long as the difference between f1 and f2 is equal to the desired frequency shift.

Figure 5:
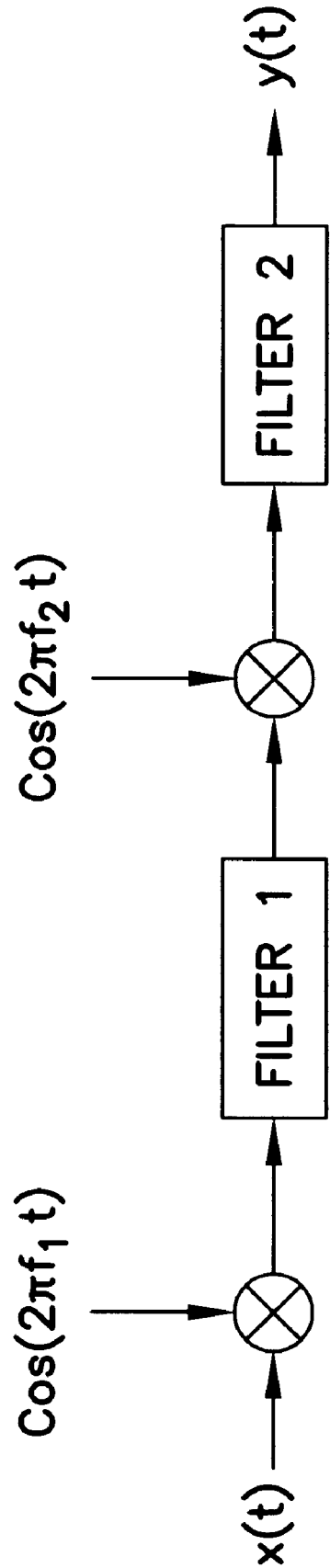
FIG. 5 is a block diagram of one embodiment of a frequency translation system.
Figure 6A:
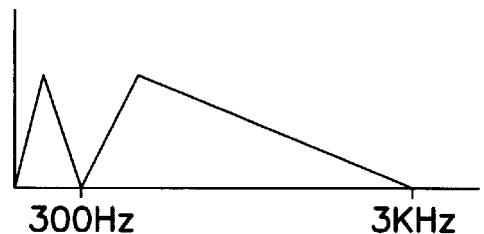
FIG. 6A shows a frequency spectrum of a first composite signal.
Figure 6B:
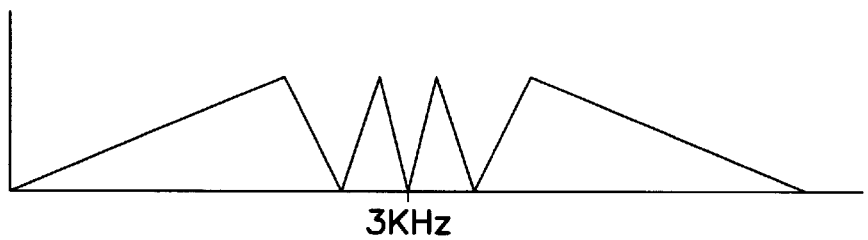
FIG. 6B shows a frequency spectrum of an output from a mixer having an input signal as shown in FIG. 6A.
Figure 6C:
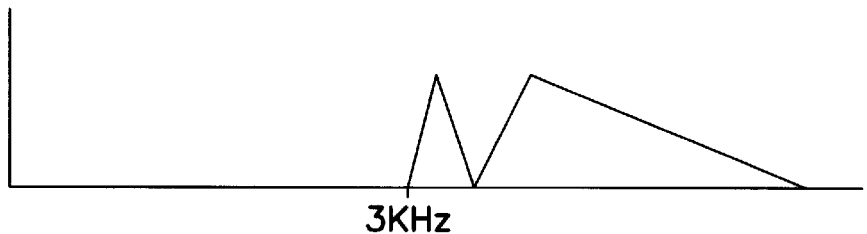
FIG. 6C shows the frequency spectrum after filtering.
Figure 6D:
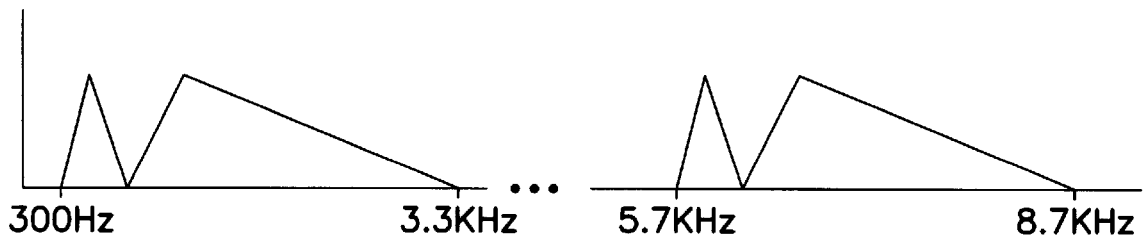
FIG. 6D shows the frequency spectrum after mixing a second time.

Yet another system of translating the composite signal is a double mixing system as shown in FIG. 5. The composite signal of FIG. 2A, also shown in FIG. 6A, is translated upband by 3000 Hz by setting f1 to 3000 Hz and mixing it with the input signal. The resulting signal is shown in FIG. 6B. Filter 1 is a high pass or band pass filter which is used to produce the signal of FIG. 6C. This signal is then translated to 300 Hz by mixing it with a 2700 Hz signal as f2. The resulting signal is filtered with a low pass filter or band pass filter to remove the 5.7 KHz signal component. The final signal is shown in FIG. 2B.

Other combinations of mixing frequencies may be used to produce the desired output signal.

II. Double Sideband System

Figure 7A:
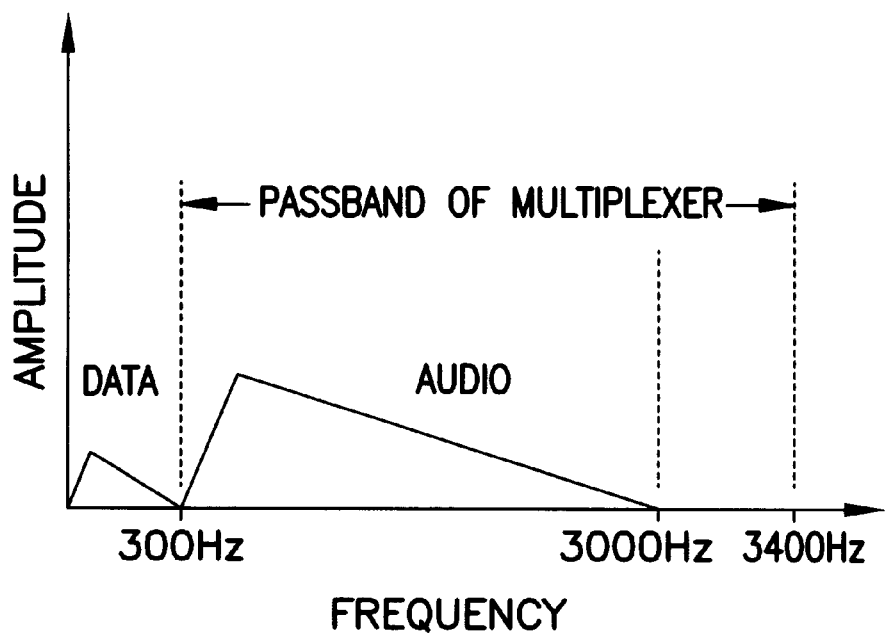
FIG. 7A shows a frequency spectrum of a first composite signal.
Figure 7B:
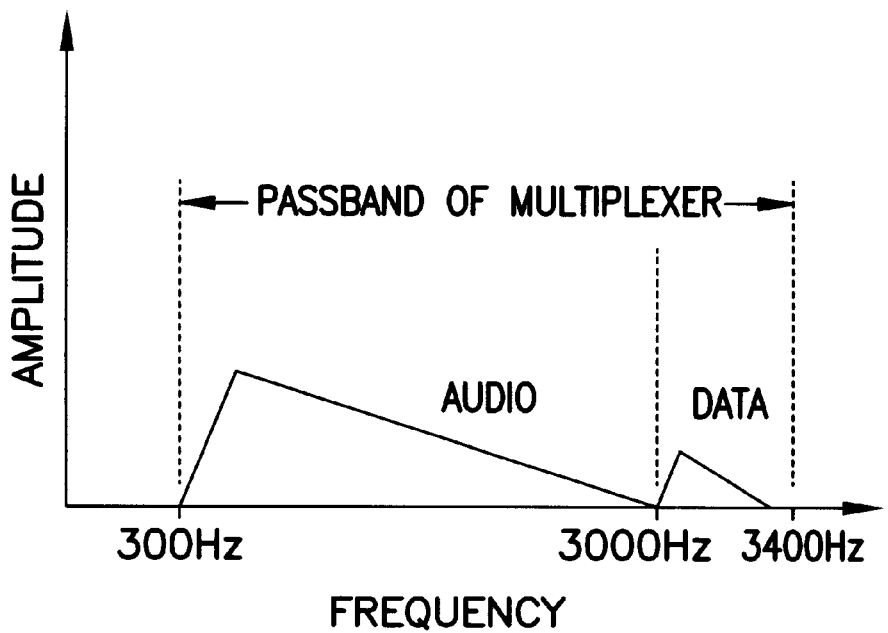
FIG. 7B shows a converted frequency spectrum of the first signal.

One embodiment of bandwidth management provides that the central site 100 contains a system which translates the data signal such that it resides above 3000 Hz but below 3400 Hz, so that it is within the passband of the multiplexer 112 (or 122). This is illustrated in FIGS. 7A and 7B. At the remote site the data signal is shifted back to its original spectral position ("reconstructed") before the composite signal, consisting of the audio signal and data signal, is transmitted to the radios in the field (not shown).

Figure 8A:
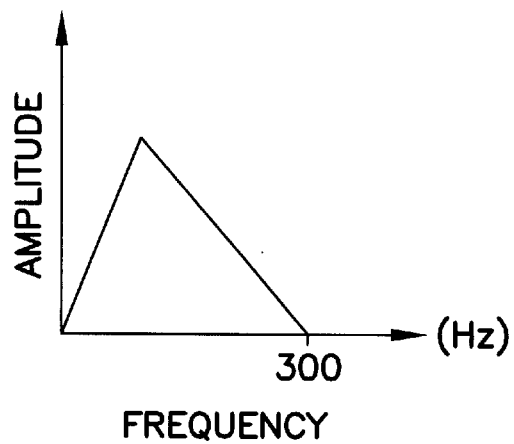
FIG. 8A shows the lower frequency portion of the first signal.
Figure 8B:
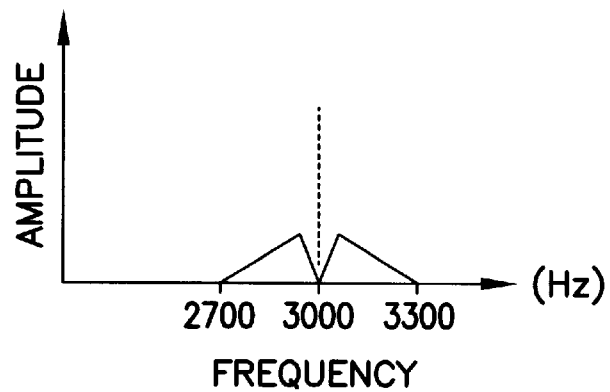
FIG. 8B shows a mixed version of the lower frequency portion.
Figure 8C:
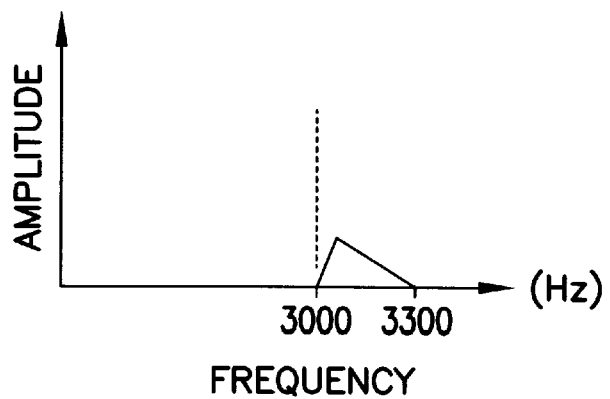
FIG. 8C shows a filtered version of the mixed version of FIG. 8B.

One method for upband translation of the data signal is shown in FIGS. 8A, 8B, and 8C. For purposes of this discussion a single frequency will represent the data signal translated. Of course, in practice the data spectrum is a Fourier series of single frequency signals, whose summation reproduces the time domain form of the data signal. Consider a single frequency, $\cos(2\pi f_x t)$, to be representative of the data signal. Multiplying the data signal by another tone, such as $\cos(2\pi 3000t)$, gives $0.5 \cos(2\pi[3000-f_x]t)+0.5 \cos(2\pi[3000+f_x]t)$. The data signal now has the form of a double sideband signal whose center frequency is higher than the original data frequency, as illustrated in FIG. 8B. Before adding the audio signal to the upband translated data signal for transmission through the multiplexer the lower sideband, is eliminated using a highpass filter. In an alternate embodiment a bandpass filter is used to eliminate the lower sideband. The upper sideband, shown in FIG. 8C, may now be added to the audio signal which extends from 300 Hz to 3000 Hz. The resulting combined signal extends from 300 Hz to 3300 Hz, as shown in FIG. 7B.

Figure 9A:
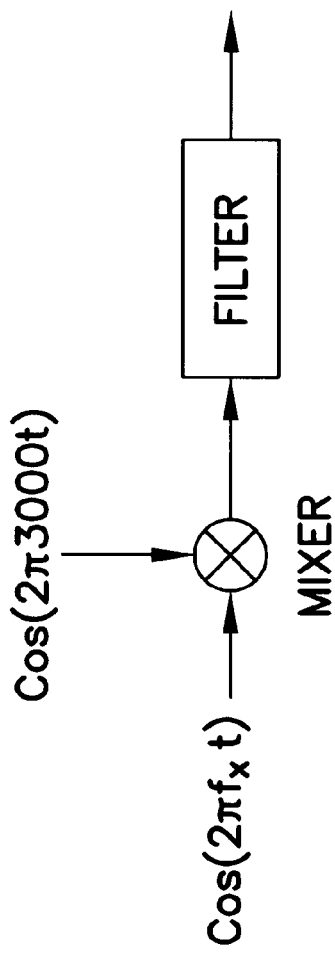
FIG. 9A shows a block diagram of one embodiment of an upconversion system.

One system for performing the upband frequency translations described is shown in FIG. 9A. The input signal $\cos(2\pi f_x t)$, which is representative of the data signal, is multiplied by the tone, $\cos(2\pi 3000t)$, to produce the signal of FIG. 8B. The filter removes the lower sideband to generate the signal of FIG. 8C.

Figure 9B:
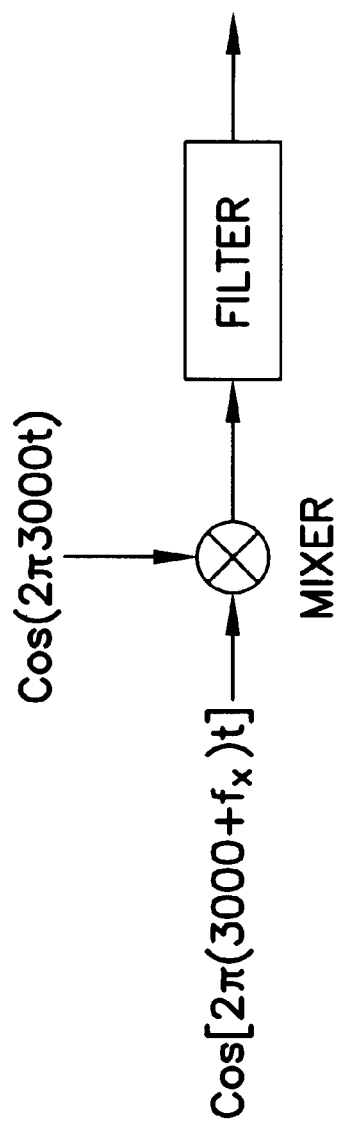
FIG. 9B shows a block diagram of one embodiment of a downconversion system.

In one embodiment, the inverse of this method is applied at the remote site to move the data spectrum back to its original position, as shown in FIG. 7A. Multiplying the data signal, represented by $\cos(2\pi[3000+f_x]t)$ by $\cos(2\pi 3000t)$ produces $0.5 \cos(2\pi ft)+0.5 \cos(2\pi 6000t)$. The second term is removed using a lowpass filter, and the original data signal represented by the first term is recovered. One system used to perform the down frequency translation is shown in FIG. 9B.

III. Single Sideband Translation System

Figure 10:
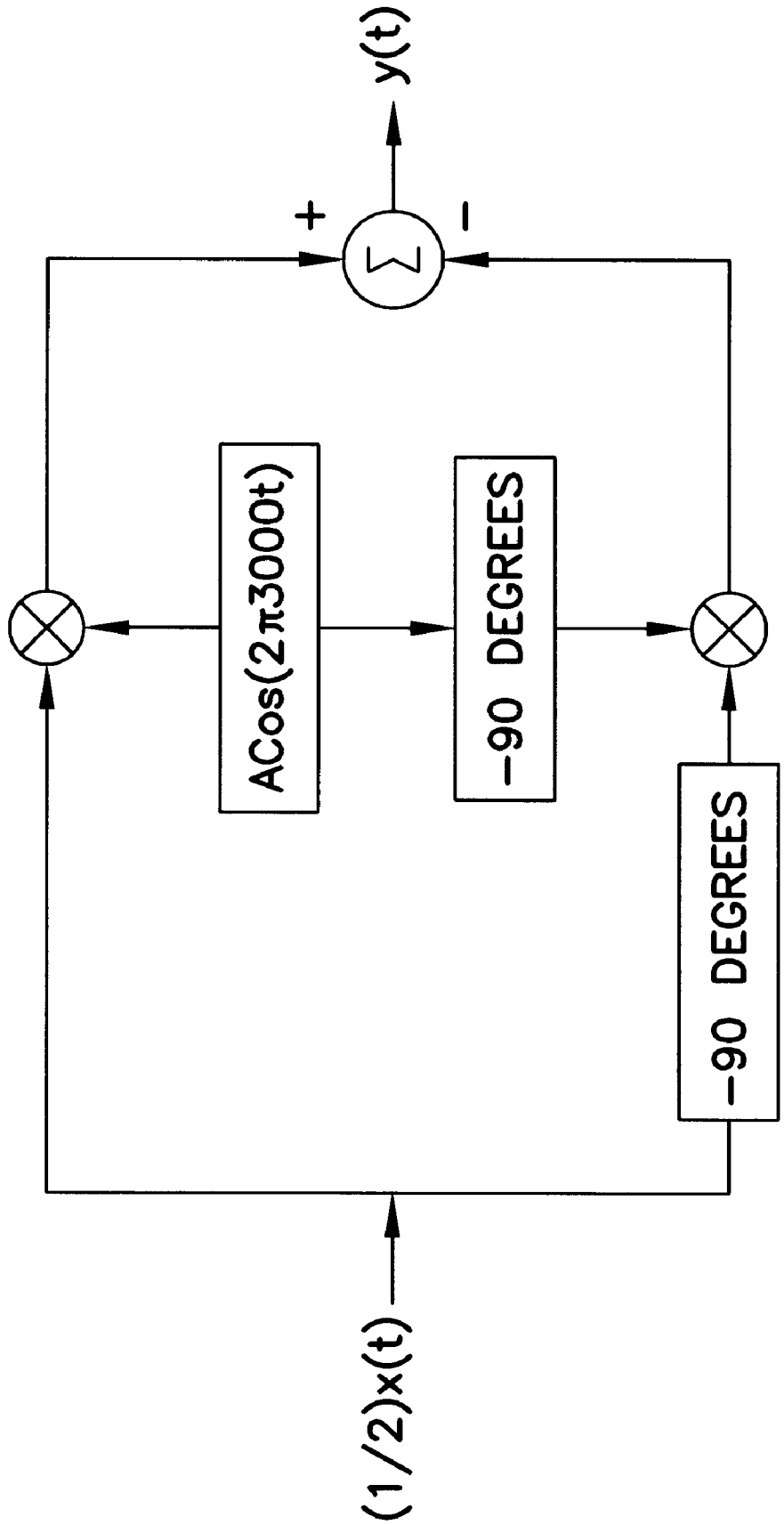
FIG. 10 shows a block diagram of one embodiment of a mixer system for upconversion.

FIG. 10 shows one system for translating the data signal upband of the audio signal, however, the shifting process does not create a double sideband signal which requires filtering, as in the last embodiment.

Again consider moving the data signal spectrum upband by 3000 Hz to create the spectral signal shown in FIG. 8C. The output signal, y(t), in FIG. 10 is:

$$y(t) = \frac{A}{2} x(t)\cos(2\pi 3000t) - \frac{A}{2} \hat{x}(t)\sin(2\pi 3000t) \qquad \text{Eqn. 1}$$

where $\hat{x}(t)$ is the quadrature signal obtained by phase shifting all components of x(t) by 90 degrees. To understand that this signal does indeed represent a single sideband of x(t) shifted upband by 3000 Hz, we write:

$$x(t) = \sum_i X_i \cos(2\pi f_i t + \theta_i) \qquad \text{Eqn. 2}$$

where, for our case, we make the restriction $f_i < 300$ Hz. The desired single sideband signal is:

$$\frac{A}{2} \sum_i X_i \cos[2\pi(3000+f_i)t + \theta_i] \qquad \text{Eqn. 3}$$

which can be rewritten as:

$$\frac{A}{2} \sum_i X_i \cos[2\pi f_i t + \theta_i]\cos(2\pi 3000t) - \qquad \text{Eqn. 4}$$

$$\frac{A}{2} \sum_i X_i \sin[2\pi f_i t + \theta_i]\sin(2\pi 3000t) =$$

$$\frac{A}{2} x(t)\cos(2\pi 3000t) - \frac{A}{2}\hat{x}(t)\sin(2\pi 3000t) = y(t)$$

This embodiment requires wideband 90 degree phase shifting, which can be difficult to design and implement and tends to distort low frequency signal components.

In one embodiment, the inverse of this system is applied to the problem of returning the data to its original spectral position (i.e., FIG. 8A). In this case the upband translated data spectrum, i.e.

$$\frac{A}{2} \sum_i X_i \cos[2\pi(3000+f_i)t + 0_i] \qquad \text{Eqn. 5}$$

which is equal to $$\frac{A}{2} x(t)\cos(2\pi 3000t) - \frac{A}{2}\hat{x}(t)\sin(2\pi 3000t) \qquad \text{Eqn. 6}$$

is the input signal on the left side of FIG. 10.

Figure 11:
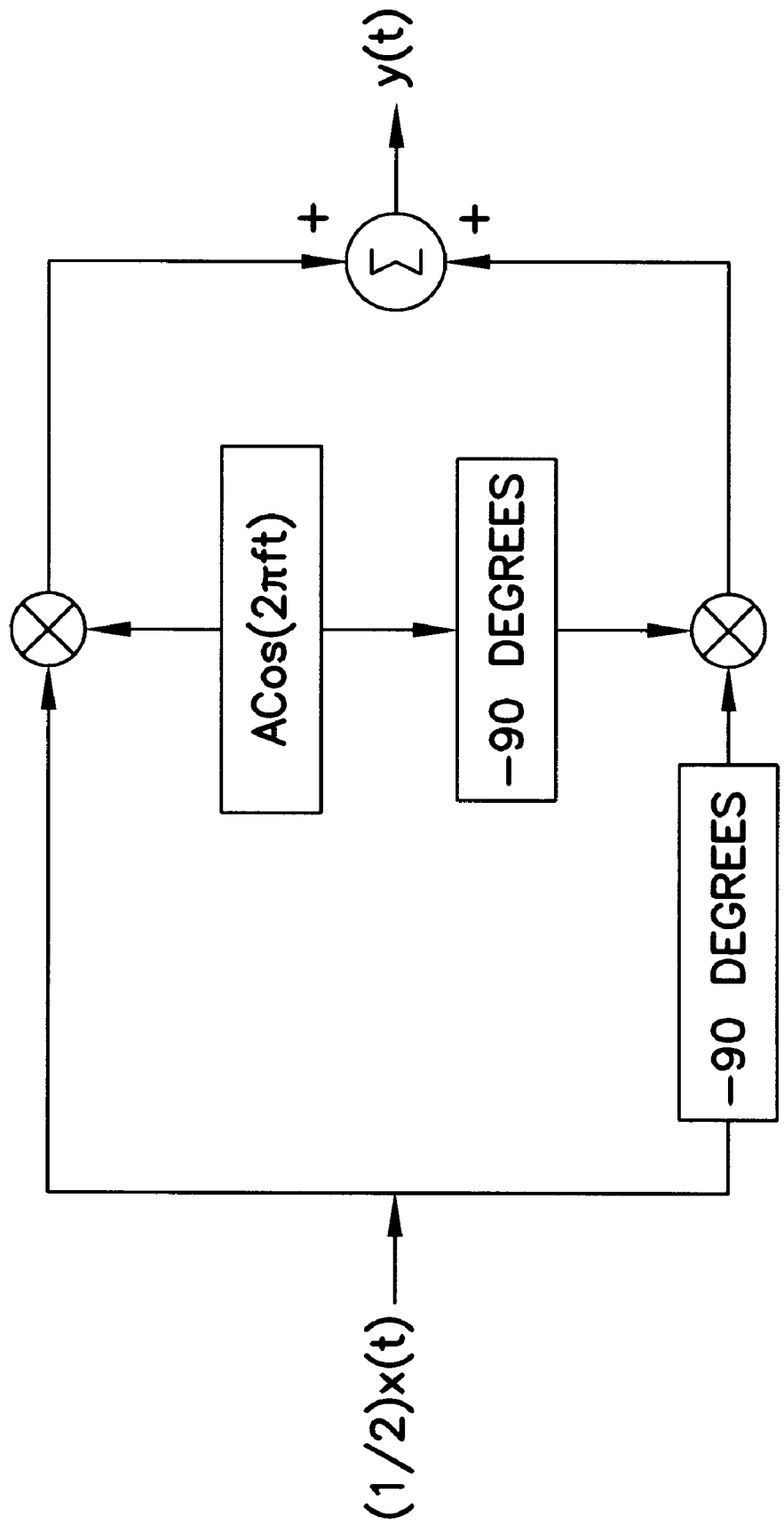
FIG. 11 shows a block diagram of one embodiment of a mixer system for downconversion.

To move the data spectrum downband, the system shown in FIG. 11 is used. The output is then $\Sigma X_i \cos(2\pi f_i + 0_i)$, which was the original data signal, as shown in FIG. 8A. The audio signal may then be added to the data signal to reconstruct the original composite signal, as shown in FIG. 7A.

Figure 12:
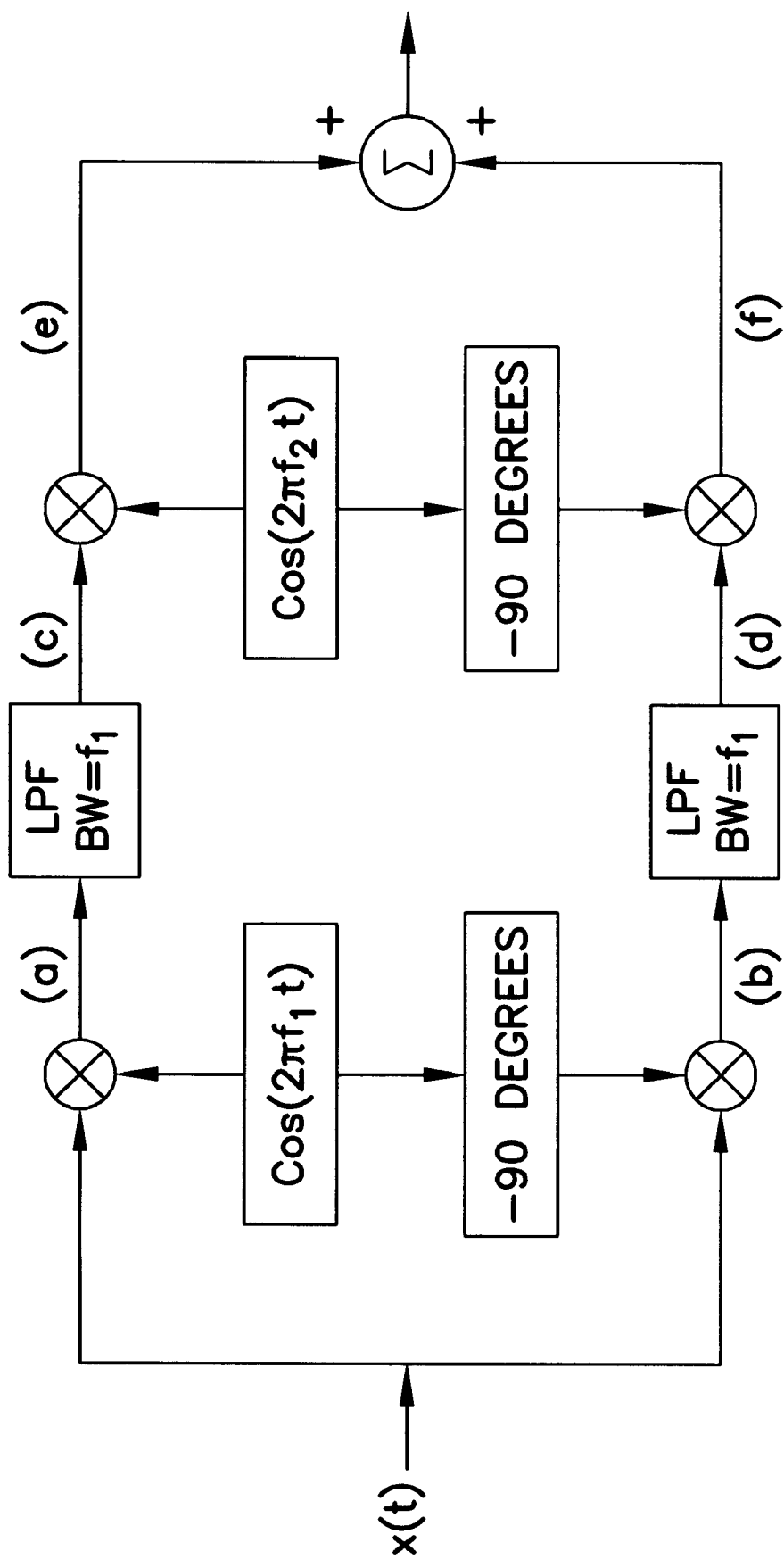
FIG. 12 shows a block diagram of one embodiment of a mixer system for upconversion.

FIG. 12 shows another system for performing the upband translation of the data signal using Weaver's method. For purposes of demonstration, the input signal, x(t), in FIG. 12 is a pure tone, $x(t)=\cos(2\pi f_x t)$. Again, recall that in actual applications, the signal will be a Fourier series of frequencies which correspond to the time domain version of the data signal. The signals at points (a) and (b) are:

$$\left(\frac{1}{2}\cos[2\pi(f_x - f_1)t] + \frac{1}{2}\cos[2\pi(f_x + f_1)t]\right) \quad \text{Eqn. 7}$$

and $$\left(\frac{1}{2}\sin[2\pi(f_x - f_1)t] - \frac{1}{2}\sin[2\pi(f_x + f_1)t]\right), \quad \text{Eqn. 8}$$

respectively. Low pass filtering with a corner frequency of $f_1$ removes the sum frequency terms, leaving the signals at (c) and (d) as $$\frac{1}{2}\cos[2\pi(f_x - f_1)t]$$

and $$-\frac{1}{2}\sin[2\pi(f_x - f_1)t],$$

respectively. The signals at (e) and (f) are:

$$\left(\frac{1}{4}\cos[2\pi(f_x - f_1 - f_2)t] + \frac{1}{4}\cos[2\pi(f_x - f_1 + f_2)t]\right) \quad \text{Eqn. 9}$$

and $$\left(-\frac{1}{4}\cos[2\pi(f_x - f_1 - f_2)t] + \frac{1}{4}\cos[2\pi(f_x - f_1 + f_2)t]\right) \quad \text{Eqn. 10}$$

respectively. Finally, the output is found by summing the last two expressions, yielding $$\frac{1}{2}\cos[2\pi(f_x - f_1 + f_2)t].$$

If $f_1=150$ Hz and $f_2=3150$ Hz the output will be a tone of frequency $(f_x+3000)$ Hz, indicating that the data spectrum which did occupy≈DC to 300 Hz has been translated upband by 3000 Hz. After the audio is added the composite data and audio spectrum is, therefore, the desired spectrum shown in FIG. 7B.

In one embodiment, this system is used to down translate the data signal spectrum. In this case the input signal is $\cos[2\pi(f_x-f_1+f_2)t]$, which is mixed with the frequency $f_2$, low-pass filtered with bandwidth $f_1$, mixed with $f_1$, and then summed. The output is $\cos(2\pi f_x t)$ which is the original data signal. The only difference between moving the data upband and moving it downband is the order in which the mixing frequencies are applied. For upband translation the first mix is with $f_1$ then $f_2$, while the opposite order is used for the downband translation process.

In one embodiment, the system of FIG. 12 is used to move the data spectrum upband so it will be passed by existing multiplexer equipment while the system of FIG. 11 is used to perform the downband translation. However, any combination of the described embodiments, and their equivalents, may be combined. These embodiments may be implemented with either digital signal processing software or using actual circuit elements.

Using GPS to Maintain Data Modem Recovery

An additional embodiment of the present invention provides a system whereby the deconversion of the translated spectrum is coordinated to minimize distortions in the reconstructed signals. This embodiment is particularly useful is in a simulcast system. Simulcast systems have remote receivers which demodulate two or more signals in overlapping broadcast regions. Distortions in the reconstructed signals complicate demodulation by a receiver in the overlap area. One example of a simulcast broadcast system is described in the copending patent application filed even date herewith entitled "SIMULTANEOUS BROADCAST MANAGEMENT SYSTEM", which is hereby incorporated by reference.

Again, assume for purposes of illustration that a sinusoidal data signal, $\cos(2\pi f_x t)$, represents the data portion transferred by the present system. This tone has been moved above the audio spectrum using the system of FIG. 12, so it is described by $\cos(2\pi[3000+f_x]t)$. The downband translation of the data portion is performed by the system shown in FIG. 13, which is described below.

The upband translation process takes place at the central site 100. The signal is then transmitted over multiplexer 102 and microwave equipment 104 to a remote site, for example, remote site 110. This transmission takes some amount of time $t_{link}$ due to the time required to propagate a signal from the central site 100 to the remote site 110 as well as time delays associated with the multiplexers 102 and 112 and microwave equipment 104 and 114. This time delay means there is an associated phase delay which is:

$$\phi_{link}(\text{in degrees})=t_{link}360(3000+f_x) \quad \text{Eqn. 11}$$

The data signal received at the remote site 110 is, therefore, $\cos(2\pi[3000+f_x]t+\phi_{link})$.

This signal must be moved back to its original spectral position. Doing so requires mixing it with a tone of frequency 3000 Hz since, for this example, the data spectrum was moved up by 3000 Hz. One use of a global positioning system (GPS) signal is to allow very precise synchronization of the mixing frequencies used in the upband and downband translation processes. Assume the mixing frequencies are exactly the same frequency and that the mixing frequencies are synchronized to the GPS units at the respective sites. In this example, the mixing at the central site is f1=250 Hz and f2=3250 Hz (using the system of FIG. 12), while the remote site uses a mixing frequency (f2-f1)=3000 Hz (using the system of FIG. 13).

Figure 13:
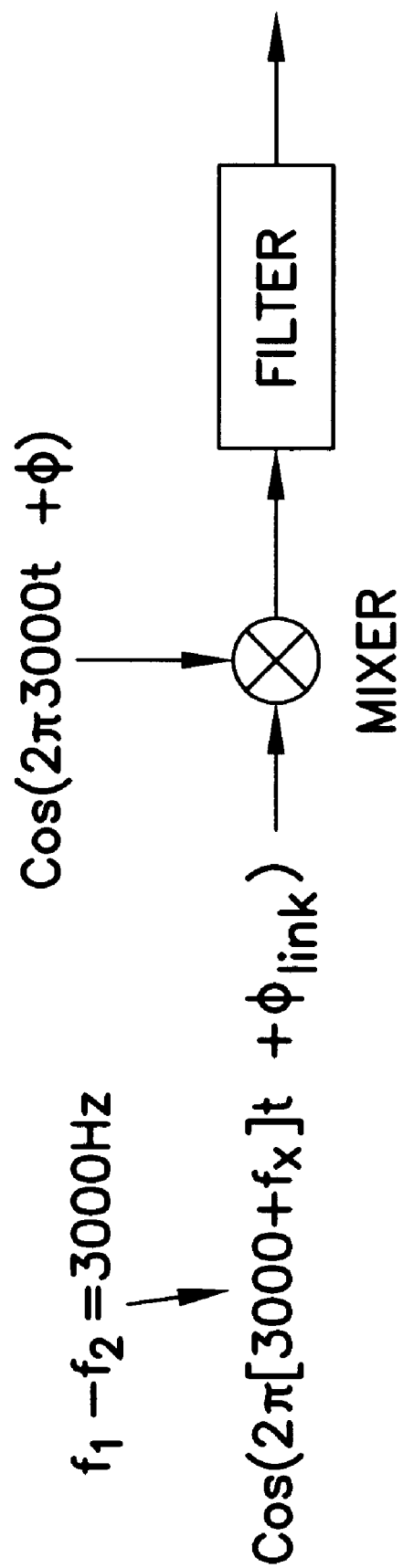
FIG. 13 shows a block diagram of one embodiment of a mixer system for down conversion.

The signals $\cos(2\pi[3000+f_x]t+\phi_{link})$ and $\cos(2\pi 3000t+\phi)$, are mixed at the remote site 110, as shown in FIG. 13. The phase term $\phi$ represents the phase relationship between the tones, since synchronization of the mixing frequencies to both be 3000 Hz does not determine the phase relationship between these tones. That is, the 3000 Hz tone at the remote site 110 is generally an unknown number of degrees out of phase with respect to the 3000 Hz tone at the central site 100.

The result from the mixing process at the remote site is:

$$0.5\cos(2\pi f_x t+[\phi_{link}-\phi])+0.5\cos(2\pi[6000+f_x]t+[\phi_{link}+\phi]) \quad \text{Eqn. 12}$$

Figure 14:
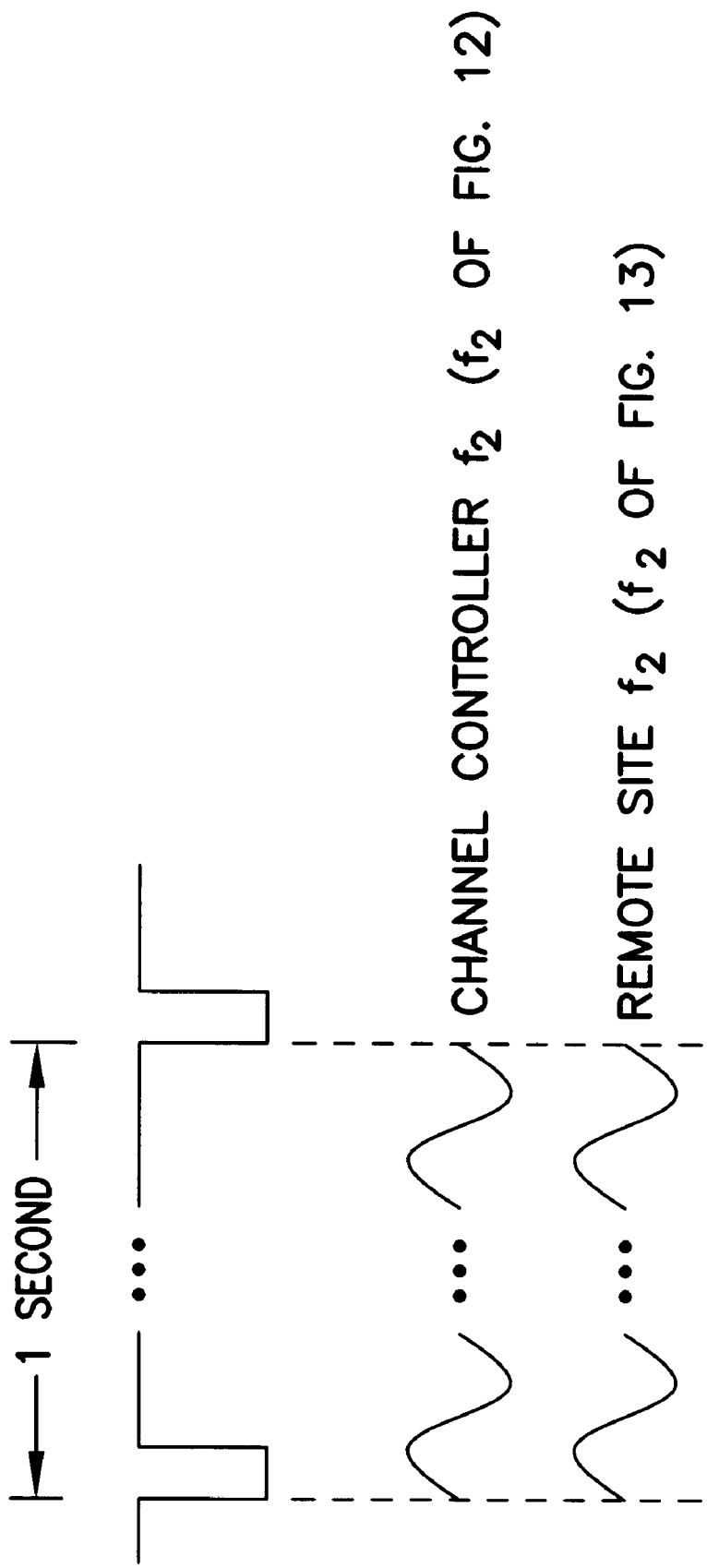
FIG. 14 shows signal timing according to one embodiment of the reconstruction system.

The second term is removed using a lowpass filter, as shown in FIG. 13. If phase is not controlled at the remote site, i.e. $\phi$, then the correct data frequency $f_x$ is recovered, but there is an unknown phase shift $[\phi_{link}-\phi]$. This phase shift causes difficulty in recovering the data signal, since the actual data signal is in reality represented by a Fourier series sum of tones. Those tones have certain phase relationships with respect to each other. If that phase relationship is corrupted, which is what occurs if we do not control φ, then when summing the tones the original data signal is not properly reconstructed. We must, therefore, ensure that $[\phi_{link}-\phi]$ is minimized. This is done by ensuring that the tones at the central site 100 and remote sites have the same frequency and a prescribed phase relationship with respect to each other. In FIG. 14 this phase relationship has been set to 0 degrees. The tone at the remote site is then passed through a variable phase (time) delay which is set to $\phi_{link}$ before it is mixed with the upband translated data. This phase adjusted signal is the cos $(2\pi 3000t+\phi)$ signal of FIG. 13. This ensures that the data waveform will be properly reconstructed.

Multiple systems may be implemented in order to minimize a phase offset, i.e. $[\phi_{link}-\phi]$. For example, a decision based recovery method where the received signal is used to determine what data has been sent. However, this method suffers the drawback that the recovery produces jitter due to the ambiguity of when the data changes state. If this ambiguity is too large they may sum at each location in such a way as to produce a large offset and provide unacceptable data distortion in the simulcast region.

Another approach is to transmit a pilot tone, along with the data signal, that indicates when state changes occur. This requires that some signal energy of the audio signal and data signal be sacrificed. Performance will suffer since the noise floor will increase because the channel energy is finite. A pilot tone also increases the DSP filtering complexity and affects system timing.

One approach is to derive system synchronization using an outside source GPS. The GPS provides fixed one pulse per second and 10 MHz clocks that can be used to provide the required synchronization. The transmitting and receiving ends both use modulation frequencies that are integers to insure that they divide into one second without remainder. That is, f2 is required to be an integer.

Each site begins generating a tone of frequency $f_2$ on a one second boundary, as shown in FIG. 14, so that all sites are phase aligned. It should be noticed that the $f_2$ frequencies at the channel controller and the remote site do not have to be equal. They both, however, reach zero at the one second mark, as illustrated.

Other embodiments are possible without departing from the scope and spirit of the present invention. For example, the GPS synchronization may be applied to any of the frequency conversion methods described herein. The present system applies in situations where the frequency translations are different and any combination of the systems taught herein may be adapted for a variety of different systems.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the specific invention. Therefore, it is manifestly intended that this invention be limited only by the claims and equivalents thereof.

What is claimed is:

1. A communication system for a repeater network, comprising:
    a first repeater site including:
        a first multiplexer having a passband P;
        a first microwave transceiver; and
        a first frequency translation system translating first data signals outside of the passband P into second data signals within the passband P;
    a second repeater site including:
        a second multiplexer;
        a second microwave transceiver; and
        a second frequency translation system extracting the first data signals from the second data signals; and
    wherein the second repeater site communicates with the first repeater site over a microwave link using the first microwave transceiver and the second microwave transceiver, and wherein the first data signals include subaudible control signals used in the repeater network.

2. The communication system of claim 1, wherein the first frequency translation system directly translates the first data signals.

3. The communication system of claim 1, wherein the second frequency translation system directly translates the second data signals.

4. The communication system of claim 1, wherein the first frequency translation system shifts a low frequency component upband of a high frequency component using a double sideband system and a high pass filter.

5. The communication system of claim 1, wherein the second frequency translation system shifts a low frequency component upband of a high frequency component using a double sideband system and a high pass filter.

6. The communication system of claim 1, wherein the first frequency translation system shifts a low frequency component upband of a high frequency component using a double sideband system and a bandpass filter.

7. The communication system of claim 1, wherein the second frequency translation system shifts a low frequency component upband of a high frequency component using a double sideband system and a bandpass filter.

8. The communication system of claim 1, wherein the first frequency translation system shifts a low frequency component upband of a high frequency component using a single sideband system.

9. The communication system of claim 1, wherein the second frequency translation system shifts a low frequency component upband of a high frequency component using a single sideband system.

10. The communication system of claim 1, wherein an external timing reference is used at the first repeater site and the second repeater site for substantially eliminating a phase error between mixing signals for deconversion.

11. The communication system of claim 10, wherein the external timing reference is a global positioning satellite signal has been inserted.

12. The communication system of claim 10, wherein a mixing signal at the second repeater site is phase offset as a function of a cumulative link delay to substantially reduce deconversion distortion between the first repeater site and the second repeater site.

* * * * *

UNITED STATES PATENT AND TRADEMARK OFFICE
CERTIFICATE OF CORRECTION

PATENT NO. : 5,991,309

DATED : November 23, 1999

INVENTOR(S) : Dana J. Jensen et al.

It is certified that error appears in the above-identified patent and that said Letters Patent is hereby corrected as shown below:

At Col. 10, line 55, claim 11, please delete "has been inserted".

Signed and Sealed this

Sixteenth Day of January, 2001

Attest:

Q. TODD DICKINSON

Attesting Officer

Commissioner of Patents and Trademarks